Nov. 11, 1958 T. D. KORANYE 2,860,287

INFORMATION STORAGE UNITS

Filed Feb. 3, 1955 2 Sheets-Sheet 1

*INVENTOR.*
THEODORE D. KORANYE

*BY* Albert R. Hodges

ATTORNEY

Nov. 11, 1958 T. D. KORANYE 2,860,287

INFORMATION STORAGE UNITS

Filed Feb. 3, 1955 2 Sheets-Sheet 2

INVENTOR.
THEODORE D. KORANYE

BY Albert R. Hodges

ATTORNEY

United States Patent Office 2,860,287
Patented Nov. 11, 1958

2,860,287

INFORMATION STORAGE UNITS

Theodore D. Koranye, Vestal, N. Y., assignor to International Business Machines Corporation, New York, N. Y., a corporation of New York Application February 3, 1955, Serial No. 485,890

9 Claims. (Cl. 315—320)

This invention relates to information storage units, and more particularly to such arrangements utilizing gaseous discharge devices.

It is a principal object of the present invention to provide an information storage unit of compact, inexpensive construction which furnishes a positive indication of the stored information.

Another object is to provide an information storage unit which furnishes a visual indication of the stored information.

An additional object is to provide an information storage unit which is relatively insensitive to supply-voltage variations over a wide range.

A further object is to provide an information storage unit, utilizing gaseous discharge devices, which does not impose critical requirements with respect to the striking voltages of these devices.

In accordance with the present invention, there is provided an information storage unit comprising first and second gaseous discharge devices having different striking voltages. There are also provided a source of potential higher than either of the striking voltages, common and individual resistance elements connected in series with these devices across this source, and switching means associated respectively with these devices. The striking voltage of the first discharge device must be higher than that of the second device, and the switching means are preferably respectively in shunt with the first device and in series with the second device. The arrangement is such that these devices provide predetermined indications which are dependent upon the actuation of the switching means.

In a modified form of the invention, a network comprising a capacitive element and first switching means is associated with the first gaseous discharge device, second switching means being associated with the second of these devices. In this arrangement, the striking voltage of the first device must be higher than that of the second device. In accordance with another modification of the invention, switching means are connected respectively in series with the first and second gaseous discharge devices.

Other objects and features of the present invention will be pointed out in the following description and claims and illustrated in the accompanying drawings, which disclose, by way of example, the principle of the invention and the best mode, which has been contemplated, of applying that principle.

In the drawings, in which like reference numerals designate like components:

Figure 1:
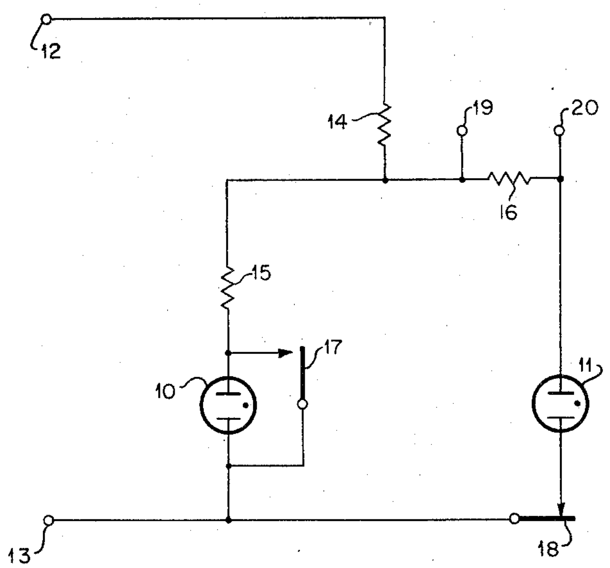
Fig. 1 is a schematic circuit diagram of one embodiment of an information storage unit in accordance with the present invention.

Referring to Fig. 1 of the drawings, there is shown an information storage unit comprising first and second gaseous discharge devices 10 and 11, a pair of terminals 12 and 13 to which is connected a suitable source of direct-current potential (not shown), a common resistance element 14, individual resistance elements 15 and 16, and switches 17 and 18. As shown, gaseous discharge devices 10 and 11 are connected in series with their respective individual resistors 15 and 16, and with common resistor 14, between terminals 12 and 13. If desired, a pair of terminals 19 and 20 may be connected to the terminals of resistor 16 for the purpose of providing an output signal. Normally open switch 17 is shunted across discharge device 10, and normally closed switch 18 is connected in series with discharge device 11.

The potential which is applied between terminals 12 and 13 is higher than the striking voltage of either of discharge devices 10 and 11, and the striking voltage of discharge device 10 is higher than that of discharge device 11.

In operation, when the operating voltage is applied between terminals 12 and 13, discharge device 11 breaks down first, since it has the lower striking voltage. The resultant potential drop across resistor 14 is sufficiently high to prevent the potential applied across discharge device 10 from exceeding its striking voltage. Upon the momentary opening of switch 18, however, discharge device 11 is extinguished and discharge device 10 breaks down, since the full potential of the source is now applied to it. The resultant current flow through discharge device 10 produces a voltage drop across common resistor 14 which is sufficiently high to reduce the potential applied to the upper terminal of discharge device 11 to a value well below the striking voltages of this device. Accordingly, the reclosure of switch 18 has no effect upon the status of discharge devices 10 and 11. Upon the subsequent closure of switch 17, however, discharge device 10 is extinguished, and discharge device 11 remains extinguished. When switch 17 opens, discharge device 10 remains extinguished, so that the voltage drop across resistor 14 disappears and a potential sufficiently high to cause the breakdown of discharge device 11 is again applied thereto, thus restoring the original status of discharge devices 10 and 11.

It will be apparent that the potential drop which is developed across resistor 16 when discharge device 11 is lighted may be utilized, by means of terminals 19 and 20, to provide an electrical indication of the status of the information unit. A visual indication is, of course, provided by the glow which occurs in either of discharge devices 10 and 11 during its breakdown condition.

Figure 4:
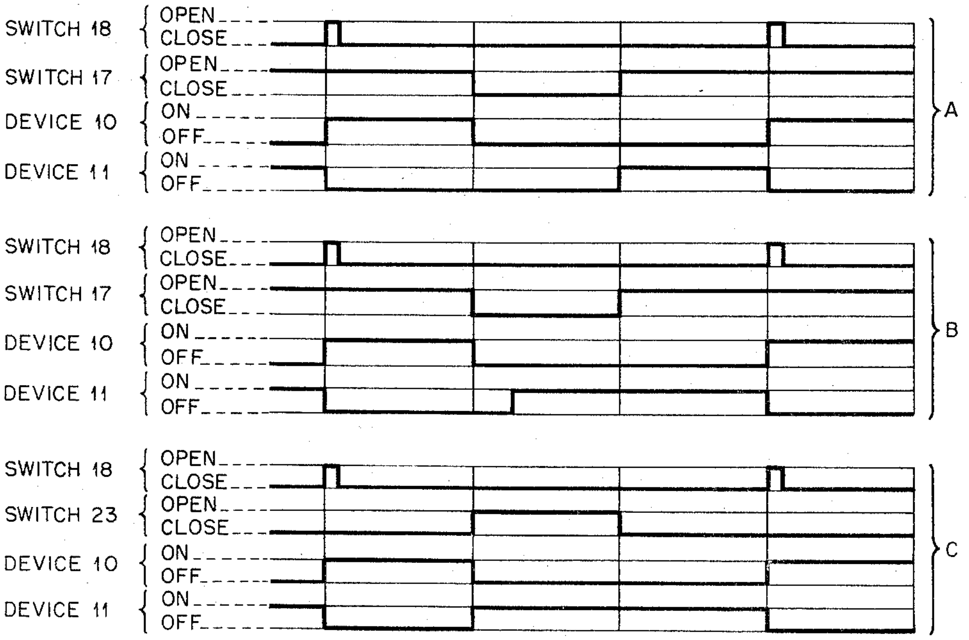
Fig. 4 is a timing chart graphically portraying the operation of the units of Figs. 1–3.

The operation of the unit of Fig. 1 is graphically represented by the curves of Fig. 4A. As shown therein, the momentary opening of switch 18 causes breakdown of discharge device 10, whereas discharge device 11 is extinguished. Discharge device 10 remains lighted until switch 17 closes, but this has no effect upon extinguished discharge device 11. Upon the reopening of switch 17, discharge device 11 again breaks down, thus restoring the storage unit to its initial or normal condition, in which discharge device 10 is extinguished and discharge device 11 is lighted.

Figure 2:
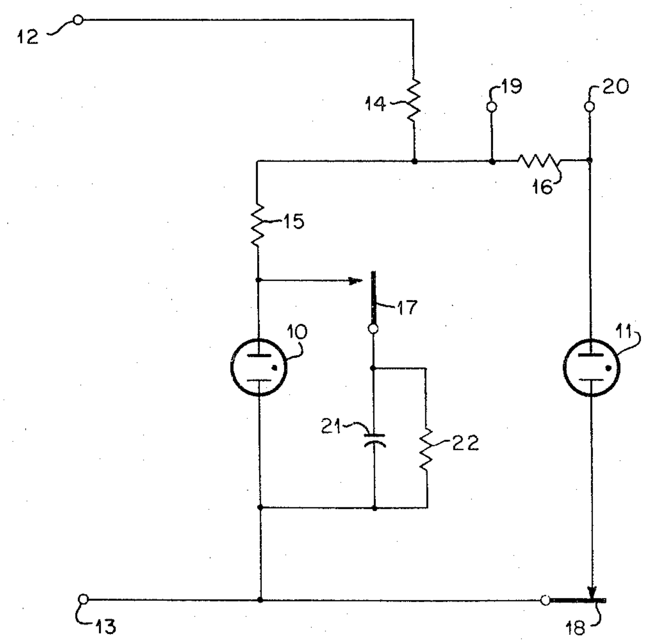
Fig. 2 is a schematic circuit diagram of a modified form of the present invention.

Reference is now made to Fig. 2 of the drawings, which shows a modification of the unit of Fig. 1 in that a network comprising a capacitive element 21 shunted by a resistive element 22 is connected in series with switch 17 across discharge device 10. The purpose of these additional elements is to provide for the breakdown of discharge device 11 after a short delay following the closure of switch 17. In other words, discharge device 11 breaks down before the re-opening of switch 17.

Let it be assumed that switch 18 has been opened and that discharge device 10 is lighted, as illustrated graphically in Fig. 4B. When it is desired to extinguish discharge device 10, switch 17 is closed so that the potential across discharge device 10 falls below its striking voltage due to the flow of current into capacitor 21. After a predetermined time interval, as determined by the characteristics of the circuit comprising capacitor 21 and resistors 14 and 15, the charge in capacitor 21 becomes high enough to permit the potential across discharge device 11, which has a lower striking voltage, to rise to a value sufficiently high to cause the breakdown of this device, although switch 17 remains closed. It will be understood, however, that switch 17 must be opened long enough before the beginning of the next cycle of operation to permit the discharge of capacitor 21 through resistor 22 to take place.

Figure 3:
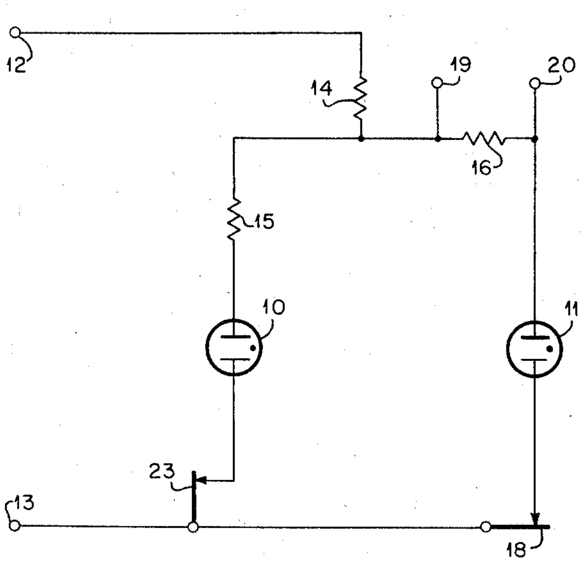
Fig. 3 illustrates a second modification of the present invention.

Turning now to Fig. 3 of the drawings, it will be apparent that the modification here shown differs from the arrangements of Figs. 1 and 2 in that shunt switch 17 has been omitted and a normally closed switch 23 has been introduced in series with discharge device 10. In this modification, discharge device 11 breaks down when switch 23 is opened to extinguish discharge device 10. Thus switch 23 has the same effect upon the operation of discharge device 10 as switch 18 has upon the operation of discharge device 11. The operation of this embodiment is clearly shown by the curves of Fig. 4C.

If any of the three embodiments above described are to be utilized to provide a visual indication of the information stored in the storage unit, it may be helpful if only one of the discharge devices 10 and 11 is made visible for observation, the other one being covered to prevent interference with proper reading of the stored information. It will be understood that the polarity of the direct-current potential source connected between terminals 12 and 13 has no effect upon the circuit operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An information storage unit comprising: first and second gaseous discharge devices having different striking voltages, a source of potential higher than either of said striking voltages, common and individual resistance elements connected in series with said devices across said source, and separate switching means associated respectively with said devices, whereby said devices provide different predetermined indications dependent upon the actuation of said switching means.

2. An information storage unit comprising: first and second gaseous discharge devices having different striking voltages, a source of potential higher than either of said striking voltages, common and individual resistance elements connected in series with said devices across said source, and switching means respectively shunting said first device and in series with said second device, whereby said devices provide predetermined indications dependent upon the actuation of said switching means.

3. An information storage unit comprising: first and second gaseous discharge devices having different striking voltages, a source of potential higher than either of said striking voltages, common and individual resistance elements connected in series with said devices across said source, and normally open switching means shunting said first device and normally closed switching means in series with said second device, whereby said devices provide predetermined indications dependent upon the actuation of said switching means.

4. An information storage unit comprising: first and second gaseous discharge devices having different striking voltages, the striking voltage of said first device being higher than that of said second device; a source of potential higher than either of said striking voltages; common and individual resistance elements connected in series with said devices across said source; and switching means respectively shunting said first device and in series with said second device; whereby said devices provide predetermined indications dependent upon the actuation of said switching means.

5. An information storage unit comprising: first and second gaseous discharge devices having different striking voltages, a source of potential higher than either of said striking voltages, common and individual resistance elements connected in series with said devices across said source, a network comprising a capacitive element and first switching means associated with said first device, and second switching means associated with said second device, whereby said devices provide predetermined indications dependent upon the actuation of said switching means.

6. An information storage unit comprising: first and second gaseous discharge devices having different striking voltages, the striking voltage of said first device being higher than that of said second device; a source of potential higher than either of said striking voltages; common and individual resistance elements connected in series with said devices across said source; a network comprising a capacitive element and first switching means associated with said first device; and second switching means associated with said second device; whereby said devices provide predetermined indications dependent upon the actuation of said switching means.

7. An information storage unit comprising: first and second gaseous discharge devices having different striking voltages, a source of potential higher than either of said striking voltages, common and individual resistance elements connected in series with said devices across said source, a network comprising a capacitive element and normally open switching means associated with said first device, and normally closed switching means associated with said second device, whereby said devices provide predetermined indications dependent upon the actuation of said switching means.

8. An information storage unit comprising: first and second gaseous discharge devices having different striking voltages, a source of potential higher than either of said striking voltages, common and individual resistance elements connected in series with said devices across said source, and switching means respectively in series with said devices, whereby said devices provide predetermined indications dependent upon the actuation of said switching means.

9. An information storage unit comprising: first and second gaseous discharge devices having different striking voltages, a source of potential higher than either of said striking voltages, common and individual resistance elements connected in series with said devices across said source, and normally closed switching means respectively in series with said devices, whereby said devices provide predetermined indications dependent upon the actuation of said switching means.

References Cited in the file of this patent

UNITED STATES PATENTS 2,638,564 Williams et al. ---------- May 12, 1953